Jan. 27, 1925.

W. G. PANCOAST

CLAMPING DEVICE

Filed March 29, 1923

1,524,275

Inventor,
William G. Pancoast,
By
Attys

Patented Jan. 27, 1925.

1,524,275

UNITED STATES PATENT OFFICE.

WILLIAM G. PANCOAST, OF WILMETTE, ILLINOIS, ASSIGNOR TO BIFLEX PRODUCTS COMPANY, OF WAUKEGAN, ILLINOIS, A CORPORATION OF DELAWARE.

CLAMPING DEVICE.

Application filed March 29, 1923. Serial No. 628,545.

*To all whom it may concern:*

Be it known that I, WILLIAM G. PANCOAST, a citizen of the United States, and a resident of Wilmette, in the county of Cook and State of Illinois, have invented certain new and useful Improvements in Clamping Devices, of which the following is a specification.

This invention relates to improvements in clamping devices, and more particularly to a device adapted to provide a secure anchorage or connection with a structural member or frame having a flange to which the device may be applied.

One specific use for a clamping device of this character is in connection with the mounting of bumpers upon motor vehicles, wherein the device is applied to the frame member and serves as an anchorage for a bracket forming the intermediate connecting member between the bumper proper and the vehicle frame. Inasmuch as the device embodying the features of the invention is adapted for a variety of uses, it is to be considered as complete in itself, although illustrated as applied to the side frame member of a motor vehicle and at a point where it might readily serve as a securing means for a bumper or even a snubber or other accessory that may be applied to the vehicle.

In the drawings, Fig. 1 is a perspective of the front end portion of a vehicle frame member with the clamping device applied to the lower flange thereof;

Figure 1:
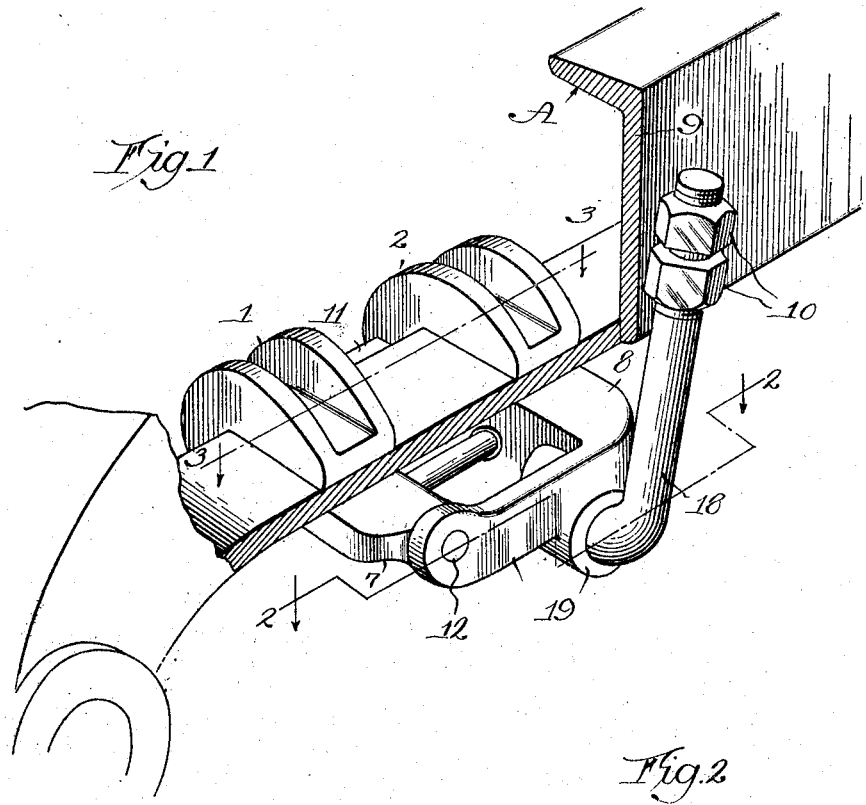

Considering the clamping device as a whole, it will be observed from Fig. 1, that the same consists primarily of two jaw members 1 and 2 having the form of hooks designed to engage the lower flange or web 3 of the vehicle side frame member, which may be indicated by A. These jaw members are substantially identical, so that it may be said that the device consists primarily of a pair of hooklike flange engaging members adapted to grip the flange at the points spaced apart longitudinally along the flange.

Figure 3:
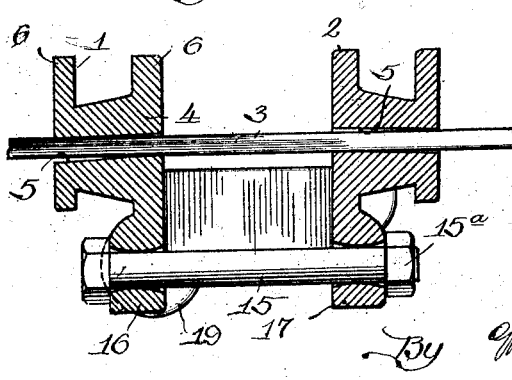
Fig. 3 is a view in vertical section taken on line 3—3 of Fig. 2.

These hook members, as clearly shown in Figs. 1 and 3, are preferably designed to afford the maximum strength, each comprising a body portion 4 of a width to provide extended and ample bearing surfaces with the upper and lower faces of the flange, these bearing surfaces being the opposite faces of a slot 5 opening outwardly and forming the hooked portions of the jaw members into which the flange 3 extends. The width of the slots 5, 5 is slightly greater than the thickness of the flange, so that the jaw members may be readily slipped in place. Extending around the body portion 4 are transverse reinforcing flanges 6—6 located at the side edges of said body portion.

The undermost portions of these jaw members 1 and 2, or what may be termed the shank portions 7 and 8, extend horizontally beyond the tips of the upper portions and thus project beyond the vertical flange or web 9 of the frame member A. It is through the medium of these shank portions that the two jaw members 1 and 2 are joined together.

The two jaw members 1 and 2 are spaced apart, and at the same time pivotally connected together by means of two parallel and transverse bars 10 and 11 located at the front and rear of the shank portions 7 and 8, these bars being preferably formed integral with the shank portion 8 of the right-hand jaw member 2 and having pivotal connection with suitable studs formed integral with and projecting from the left-hand jaw member, 1. Moreover, the form of pivotal connection is varied somewhat in order to prevent the relative displacement of the parts in either a longitudinal or transverse direction. Thus, the forward arm 10 extends a short distance beyond the forward end of the jaw member 7 and is provided with a circular opening which engages a cylindric stud or pin 12 formed integral with the shank portion 7 of the jaw member 1. The rearmost bar 11 terminates short of the innermost lateral face of the jaw member 1 and has endwise abutting engagement with a half round boss 13 which engages a semi-circular notch or socket 14 formed in said arm, said socket being preferably closed at its outermost side so as to prevent lateral displacement in the direction which would disconnect the forward arm 10 and pin 12.

In other words, by adopting two forms of pivotal connection between the jaw members, displacement in all directions is provided against, but at the same time the necessary amount of pivotal movement is required to actuate the device and effect the gripping action of the jaw members.

Figure 2:
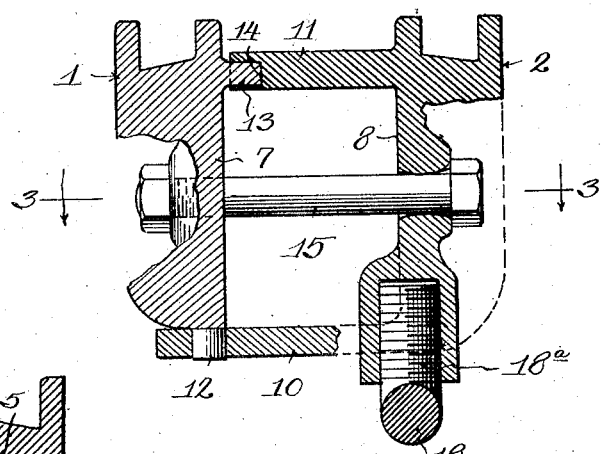
Fig. 2 is a view in horizontal section as taken on line 2—2 of Fig. 1.

In addition to the arms 10 and 11, the jaw members are further connected together by means of a centrally located bolt 15 extending transversely below the shank portions of the jaw members and retained within integral eyes 16 and 17 respectively which are dropped down from the under sides of the shank portions of said jaw members. As clearly shown in Figure 2, this bolt 15 is situated intermediate the front and rear arms 10 and 11 and extends parallel thereto.

Referring now to Figure 3, the manner in which the device functions to grip the flange 3 is clearly shown. This is accomplished by tightening the nut 15$^a$ of the bolt 15, sufficiently to upset or displace the jaw members with respect to the vertical, by drawing the lower portions together and separating the upper portions. The result of this displacement is manifestly to produce a buckling or gripping action between the jaw members and the flange, as is shown in Figure 3, by the slight degree of obliquity of the bearing surfaces to the flange 3. In this manner the jaws firmly grip the flange, and the grip is maintained so long as the bolt 15 remains tightened. The relative movement of the jaw members required to cause the same to grip the flange is afforded by the pivotal connections at the ends of the arms 10 and 11.

Manifestly by loosening the bolt 15 the jaw members will release their grip upon the flange and the entire device removed. This also suggests the method of applying the device, namely, by loosening the bolt so that the jaw members are parallel so that they may readily slide onto the flange, and then tighten the nut 15, causing the jaw members to take a firm grip upon the flange, as already explained.

As a convenient means for connecting the clamping device with any member to be secured to the vehicle frame, a threaded shank or bolt 18 is preferably employed, the same being L-shaped to provide a short threaded shank 18$^a$ adapted to be screwed into a threaded socket formed in a boss 19 cast integral with the shank portion 8 of the jaw member 2. This socket opens outwardly and laterally, so that in fitting the shorter threaded shank 18 into said socket the main portion of the bolt 18 extends at right angles to the flange 3 and spaced outwardly from the frame member A. Moreover, by reason of the screw threaded connection between the connecting bolt 18 and the clamping device, said bolt may be rotated to any angle desired, and to accommodate the part or member to be attached thereto. As a preferable means of attachment the extremity of the bolt 18 is threaded to receive nuts 20, 20.

This device consisting of two longitudinally spaced jaw members, is manifestly superior to any small form of single hook bolt in that it is capable of taking a firm grip or bite on the flange, and when once applied cannot work loose or in any manner become removed from the frame member. This form of clamping device is especially convenient in its method of attachment, inasmuch as it can be easily applied to the frame member and adjusted longitudinally to the position desired, and then firmly anchored in place by tightening the bolt 15 slightly.

As has already been suggested, a device embodying the principle and features of construction herein disclosed may be used in a multitude of ways and therefore I do not wish it understood that the invention is limited to its application for any specific purpose. With this in mind, I claim as my invention:

1. A clamping device comprising a pair of jaw members adapted to engage a flange or the like at points spaced apart longitudinally thereof, a connecting member extending transversely between said jaw members adjacent said flange and having pivotal connection with one of said jaw members, and an expansible and contractable member connecting said jaw members at points offset from said connecting member.

2. A clamping device comprising a pair of jaw members spaced apart transversely to engage a flange or the like and provided with transverse connecting members, extending longitudinally of said flange, one of said connecting members being fulcrumed on one of said jaw members and the other being expansible to effect the relative displacement of said jaw members about said fulcrum point.

3. A clamping device comprising a pair of parallel jaw members adapted to engage a flange or the like, an arm extending transversely between said jaw members adjacent said flange and having pivotal connection with one of said jaw members, and means connecting said jaw members and offset from said arm and adapted to be adjusted to displace said jaw members to grip said flange.

4. A clamping device of the character described comprising a pair of jaw members adapted to engage a flange or the like, arms extending transversely between said members and on one side of said flange and having pivotal connection at one end with one of said jaw members, and a bolt extending between said jaw members and offset from the plane of said arms and adapted to be adjusted lengthwise to displace said jaw members to grip or release said flange.

5. A clamping device of the character described comprising a pair of jaw members adapted to engage a flange in laterally spaced relation, arms extending transversely between said members adjacent said flange and having pivotal connection with one of said jaw members, eyes formed integral with said jaw members, and a bolt extending between said eyes.

6. A clamping device comprising a pair of jaw members adapted to have hooked engagement with a flange or the like, transverse arms formed integral with one of said members and having pivotal connection with the other member, and a bolt extending parallel with said arms and in a plane offset therefrom, and adapted to be adjusted to actuate said jaw members to grip said flange.

In witness whereof, I hereunto subscribe my name this 24th day of March, A. D., 1923.

WM. G. PANCOAST.